Figure 7:
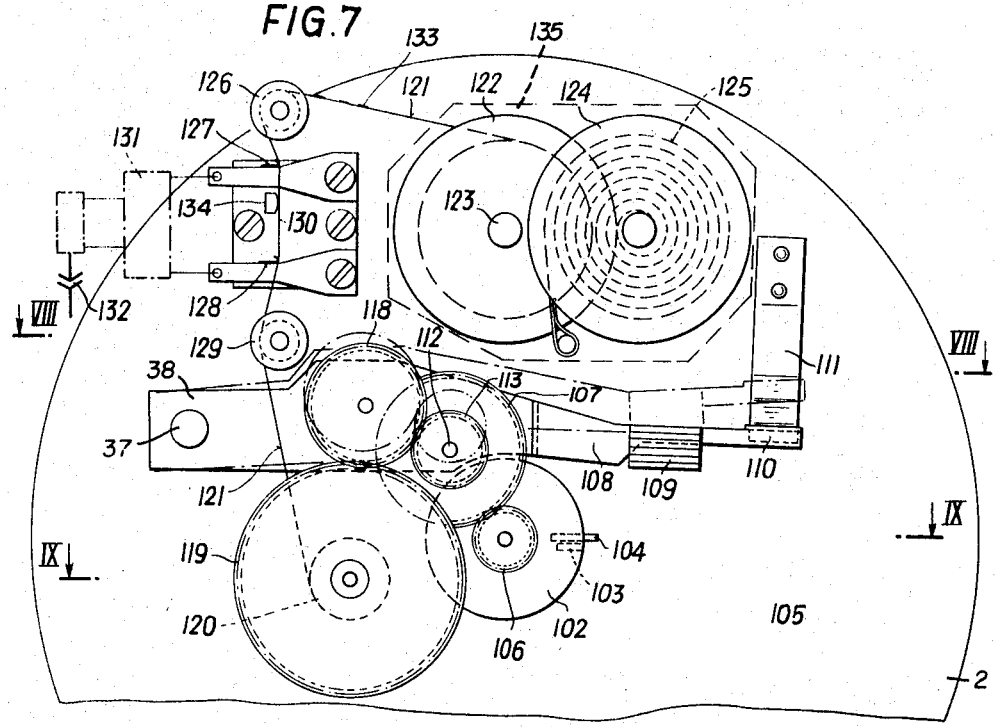

United States Patent

Drahonovsky

[15] 3,637,162
[45] Jan. 25, 1972

[54] CINEMATOGRAPHIC TAKING OR REPRODUCING APPARATUS

[72] Inventor: Michael Drahonovsky, Vienna, Austria

[73] Assignees: Karl Vockenhuber; Raimund Hauser, Vienna, Austria

[22] Filed: Sept. 25, 1969

[21] Appl. No.: 860,984

[30] Foreign Application Priority Data

Sept. 27, 1968  Austria ............................... A 9472/68

[52] U.S. Cl. ............................... 242/188, 242/205, 352/174
[51] Int. Cl. ................. B65h 59/38, G11b 1/52, G11b 15/06
[58] Field of Search ..................... 242/54.1, 188, 206–210; 352/170–175

[56] References Cited

UNITED STATES PATENTS

| 2,561,602 | 7/1951 | Valentino et al. | 242/201 X |
| 2,998,939 | 9/1961 | Scott | 242/208 X |
| 3,032,285 | 5/1962 | Brede | 242/208 |
| 3,167,264 | 1/1965 | Ohtsu | 242/201 |

Primary Examiner—Leonard D. Christian
Attorney—Ernest G. Montague

[57] ABSTRACT

A reproducing apparatus for a striplike information carrier member drive means which is adapted to transport the carrier member alternatively in forward and reversed transporting direction. Metering means have an operating condition and a resting condition, in operating condition metering alternatively forwards and backwards according to the transporting direction. Connecting means are adapted to connect the drive means with the metering means to bring the latter in operating condition. Means are controlled by the metering means upon reaching a metering value to be predetermined and which comprise stop means adapted to stop the drive means.

10 Claims, 9 Drawing Figures

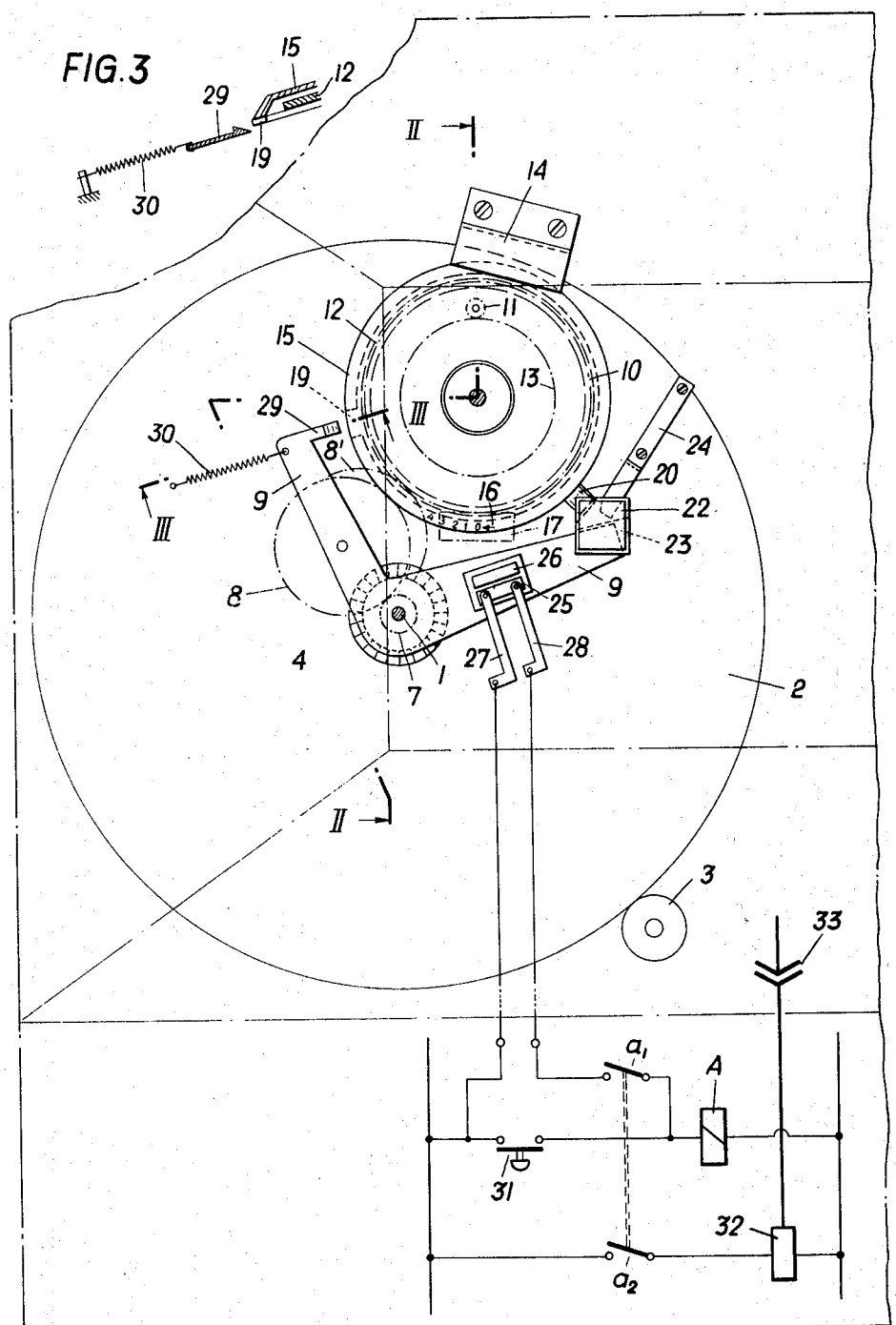

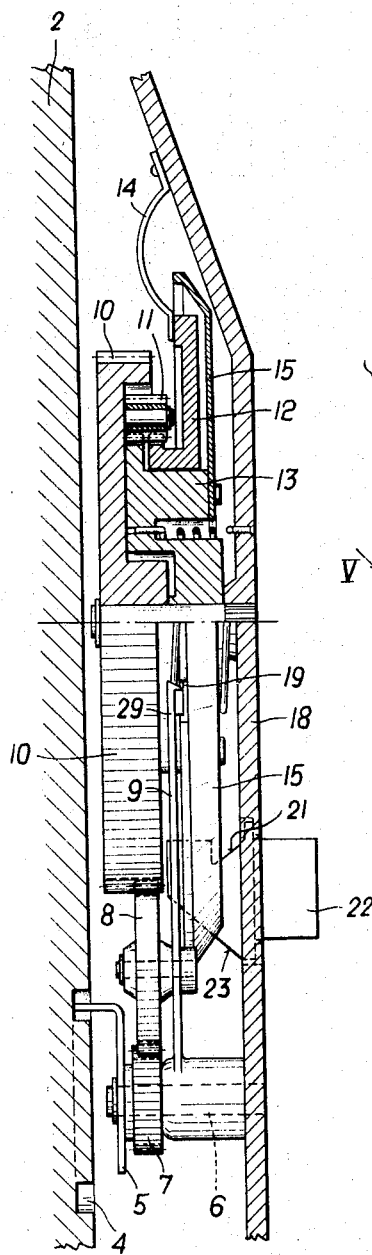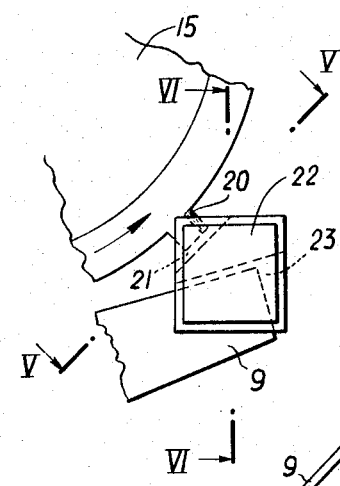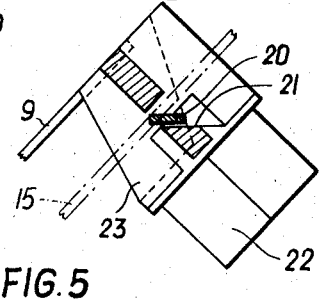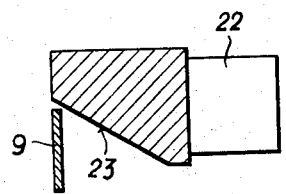

3,637,162

CINEMATOGRAPHIC TAKING OR REPRODUCING APPARATUS

The invention relates to a cinematographic taking or reproducing apparatus provided with a metering device or the like, connectable with a strip transporting mechanism and metering forwards and backwards according to the transporting direction, which metering device controls functions of the apparatus upon reaching a predetermined position.

At lectures accompanied by film, especially at school, it happens very often that the lecturer, e.g., the teacher wishes to show an especially interesting scene for a second time or more. After termination of such an interesting passage, the lecturer has to find out the beginning of the passage by rewinding the film, which is rather troublesome and time-wasting and in certain cases cannot be done at all during the lapse of time being at disposal, so that often a repetition is waived. Since "repetitio mater studiorum est," this disadvantage is especially troublesome at school.

By the invention this disadvantage is eliminated and it becomes possible to repeat an interesting passage to your liking, whereby the beginning of the passage is found out automatically in a simple and reliable way. This succeeds according to the invention, in that the metering device or the like is adapted to be switched on, when the apparatus operates in one of the two possible transporting directions of the strip drive and controls mechanical and/or electric switching means in the drive of the apparatus, which interrupt said drive upon reaching a predetermined position of the metering device or the like and/or preferably reverse the transporting direction of the strip. When it is spoken in this connection of a metering device, an arrangement should be understood as known for meters, but which need not necessarily be combined with figure dials or the like, as it is usual with traditional meters. The lecturer has merely to switch on the inventive metering device during forward operation of the apparatus at the beginning of the passage to be repeated, and to switch on reverse run at the end of the passage. The strip carrying the information will then run back only to the beginning of the passage marked. This procedure may be optionally repeated.

Not always it will be possible to a lecturer, in particular to a teacher, to prepare his lecture or the like, that he knows the film by heart and every scene of it. In such cases a certain reaction time has to be taken into consideration lasting from the very beginning of the passage till to the decision to repeat it. It may also be useful to repeat the beginning of a passage in connection with the end of the foregoing scene. According to an advanced development of the invention, this is possible in that a delay member is provided between the metering device and the switching device by means of which switching off or reversing of the apparatus takes place after a certain time, which in cases may be set after having reached the initial position of the metering device or the like. By this arrangement it is possible to rewind scenes at any desired length without further manipulations.

When using the apparatus for instance for propaganda purposes, it is desirable that after rewind operation the apparatus is immediately ready for renewed forward operation. It is only required therefor to engage the coupling for said metering device after runoff of the leader of the film or strip, so that at reverse run the leader is no more rewound on the supply reel and upon renewed setting in operation, no threading procedure takes place. In order to meet all these modes of application, it is necessary that the metering device is able to accumulate the entire possible lengths of film or strip respectively. With the required large reduction gear ratio and the inavoidable drive tolerances, in case considerable divergences may happen in finding a certain passage of the film or strip.

In order now to improve the precision of the metering means, the metering device shows two spools or the like, on which a tape is coiled up, the one end of which being fastened to the first spool and the other one being fastened to the second spool, whereby the first spool is adapted to be coupled and driven by means of a cutoff coupling with or by respectively the strip transporting mechanism, in particular the takeup reel, which is driven by said drive mechanism, while the second spool is under the action of a spring or the like, which strives to wind up the tape on the spool, whereby the switching means are controllable by the tape wound up on said spool. As with respect to the determination of the tape length there exists a high degree of freedom, it is possible to adapt the precision of the metering means to the actual demands in consideration of the maximum film or strip lengths given. The tape may be provided with at least one conductive foil and may be guided over cooperating contacts fixed to the equipment. In an advanced embodiment of the invention a switch is provided in the circuit of the cooperating contacts, which is connected with the coupling and opens the circuit, when the coupling is in its disconnecting position.

In another embodiment of the invention however, it is also possible to provide the tape with notches, holes or the like, which cooperate with the corresponding switching means. It is advantageous to design these switching means likewise an electric switching means, which may be sensing means abutting the tape border, or pairs of contacts, which are electrically isolated by the tape passing between them and which release an impulse, when there passes a hole or a notch. According to a further embodiment of the invention the tape may be a magnetic tape, as already known, opposite of which lie soundheads for the reproduction and in case also for the recording or erasing of control signals. In such an arrangement it is possible to release different control signals by the metering device and to operate therewith different functions of the projector. Suitably, the tape bears marks, in particular numerals visible through a window of the apparatus or reproduced on a screen.

Figure 8:
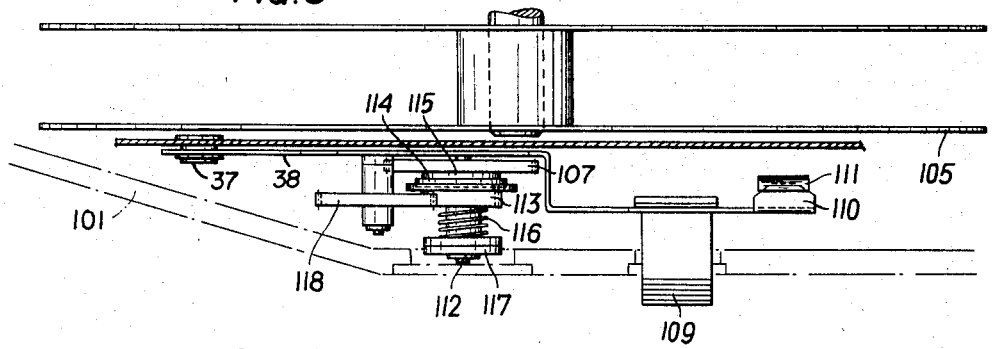
Figure 9:
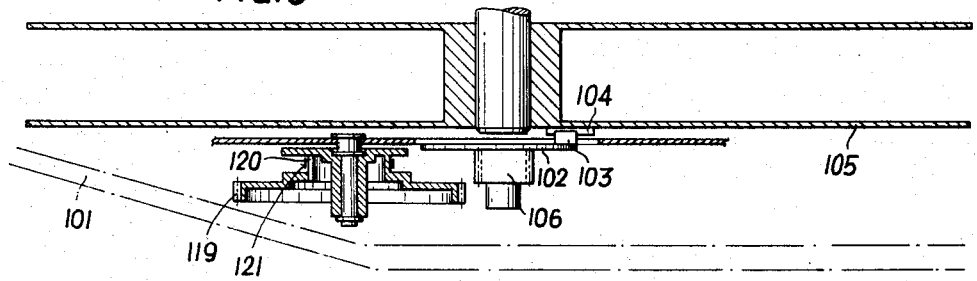

Further features and advantages of the invention will become apparent from the following specification of embodiments schematically illustrated in the drawings in which FIG. 1 shows the invention arrangement in lateral view, FIG. 2 represents a cross section taken along the lines II—II of FIG. 1 in magnified illustration, FIG. 3 shows a detail taken along the line III—III of FIG. 1, FIG. 4 is an enlarged section of FIG. 1, FIGS. 5 and 6 display sections taken along the lines V—V and VI—VI, respectively of FIG. 4, FIG. 7 shows the view of a further embodiment of the inventive metering device, whereby for the sake of a clear illustration, the casing cover of the apparatus has been removed, FIGS. 8 and 9 display sections along the planes VIII—VIII and IX—IX of FIG. 7.

On an axis 1 there is arranged a takeup reel 2, which is driven by a friction roller 3 at its circumference. The takeup reel 2 shows notches 4 for the engagement with a clutch coupling 5 (see FIG. 2) which is fastened on a shaft 6 which is coaxial to the axis 1. The shaft 6 is also provided with a pinion 7 that drives an intermediate gearwheel 8. This intermediate gearwheel is pivotally supported by a bellcrank 9 and mates in coupled position 8 with a cup-shaped gearwheel 10 (see FIG. 1). Inside this cup-shaped gearwheel there is arranged a planet pinion 11, which mates with two coaxial gearwheels 12, 13 with different teeth numbers (see FIG. 2). One of the gearwheels is for instance provided with 100 teeth, the other one only with 99. Of the two gearwheels 12, 13, the gearwheel 12 is braked by a brake 14, so that it usually stands still. Thereby the movement of the planet pinion 11 is transmitted to the gearwheel 13. With the mentioned relation of teeth numbers, there results a transmission ratio of 1:100. To the gearwheel 13 there is connected a cup-shaped scale disk 15, the graduation 16 of which is visible through a window 17 (see FIG. 1) in a cover 18 of the casing (see FIG. 2).

The periphery of the scale disk 15 shows a clearance 19 in one place. In another place of the periphery of the scale disk 15 there is arranged an extension 20 provided with a slope (see FIGS. 1, 4). The exact position of this slope is illustrated in FIG. 5, in which for the sake of clear understanding, the scale disk 15 is indicated in dash-dotted lines, though it cannot be visible due to the course of the cross section. As it further results from FIGS. 4, 5, the oblique extension 20 of the scale disk 15 cooperates with an oblique surface 21 of a key 22. The key 22 however shows a second oblique surface 23 situated in another plane (see FIGS. 2, 4, 6) by which the bellcrank 9 is operated. A sheet spring 24 (see FIG. 1) constantly presses the key 22 outwards through the casing cover 18.

Operating the key 22 during forward run against the force of a spring 24, the scale disk 15 is slightly deviated in counterclockwise sense, in that the oblique surface 21 slips off from the extension 20. As the scale disk 15 is coupled with the braked gearwheel 12 by means of the gearwheel 13 and the planet pinion 11, the gearwheel 12 is driven by this movement of the scale disk 15 overcoming the brake pressure of the brake 14.

Simultaneously with the deviation of the scale disk 15, the bellcrank 9 is deviated in clockwise sense by the oblique surface 23 of the key 22. On the bellcrank 9 there are fastened two contact bridges 25, 26 bridging two contacts 27, 28 in both end positions of the bellcrank 9. The bellcrank 9 further shows a resilient claw 29 at its end averted from the key 22. Upon deviation of the bellcrank 9 by means of the oblique surface 23 of the key 22 against the force of a spring 30 and while simultaneously also the scale disk 15 is deviated, the claw 29 strikes the full circumference of the cup-shaped scale disk 15. The clearance 19 of the scale disk, originally lying opposite the claw 29, was drawn out of the deviation range of the claw by the deviating movement of the scale disk. When the claw 29 strikes the cup-shaped scale disk 15, the claw will flex and finally latch behind the circumference of the scale disk 15. Thereby the intermediate gearwheel 8 mates with the gearwheel 10 and drives the scale disk 15 in dependence on the rotation of the takeup reel 2. This drive connection is so long in force until the interesting film scene is terminated, whereupon the lecturer switches on reverse run by means of a switch 31 (see FIG. 1). Then a self-locking relay A closes two contacts $a_1$, $a_2$. Simultaneously a reverse coupling 33 is switched on by means of a solenoid 32. The scale disk 15, which during forward run always turned in clockwise sense, changes its direction of rotation upon reverse run. The reverse run lasts so long until the clearance 19 in the scale disk 15 reaches the claw 29, whereupon this is disconnected by a spring 30. Thereby the intermediate wheel 8 is uncoupled. By this rotating motion of the bellcrank 9, the circuit containing the contacts 27, 28, which was closed by the contact bridge 26 during reverse run, is now interrupted for a short moment that is sufficient for the relay to release and open the two contacts $a_1$, $a_2$. The solenoid 32 is then deenergized and the coupling 33 is opened. Consequently reverse run is interrupted.

In that the scale disk 15 is deviated by operating the key 22 by means of its oblique surface 21 and the extension 20, reverse run is not exactly interrupted at the sequence of images passing on the screen, when the key 22 is operated, but a certain number of images earlier. In that way it is taken into consideration that a certain reaction time will go by until the lecturer will have decided to repeat a scene. In the same way also the end of the foregoing scene may be repeated. It is therefore useful to arrange the extension movably on the scale disk 15, so as to provide for different requirements.

It will be advisable to design the metering device 10, 11, 12, 13, 15 thus, that winding up of a whole film length of thin film material onto the takeup reel 2 will correspond to one rotation of the scale disk 15 of maximum 360°, preferably less. If desired the metering device may then be used for the whole film, whereby the scale 16 passing along a fixed mark in the scale window 17 gives the lecturer any required information about the runoff of the film.

Of course the inventive reproducing apparatus need not implicitly be designed in the illustrated manner. It is also possible to provide means instead of the bellcrank 9 and the claw 29 cooperating with the clearance 19, whereby for instance the clearance 19 may be replaced by a stop, which releases the coupling of the metering device upon butting a respective control member. It would also be possible that such stops become effective by means of the key 22 on optionally different places of the scale disk 15 or the like. Further it will be advantageous to switch automatically on forward run immediately after termination of rewind by providing for instance further contact bridges on the bellcrank 9 or the like operating relative switching contacts.

In the FIGS. 7 to 9 another metering device is illustrated, whereby elements of the same function have the same reference numerals as in the FIGS. 1 to 6. The lever 38 bearing the intermediate gearwheel 107 is pivotally arranged round an axis 37 and bears a key. An extension 110 of the lever 38 cooperates with a sheet spring 111, which is bent like a roof and which enables the latching of the lever 38, as well in its operating position illustrated in FIG. 7 in full lines, as also in its rest position illustrated in dash-dotted lines. On the shaft 112 of the intermediate gearwheel 107 a further pinion 113 is pivotally arranged. Between the intermediate gearwheel 107 and the pinion 113 there is arranged a torque overload clutch 114, 115 (see FIG. 8), which is loaded by a spring 116, propping to the pinion 113 on the one hand and to a screwed nut 117 on the other hand. On the lever 38 a second gearwheel 118 is further pivotally arranged, which on the one hand mates with the pinion 113 and on the other hand may be forced into engagement with a stationary gearwheel 119 by deviating the lever 38 to its operating position, said gearwheel 119 being fixed to a spool 120 for a tape 121. One end of the tape 121 is fixed to the spool 120, while the other end of the tape 121 is fastened to a spool 122 (see FIG. 7). The spool 122 is connected with a spiral spring 125 by means of a transmission gear 123, 124, which spiral spring 125 strives to drive the spool 122 in clockwise sense. The tape 121 is guided by the spool 122 over a guide roller 126 and a stationary pair of contacts 127, 128 as well and runs over a further guide roller 129 to the spool 120.

The mode of operation of this arrangement is essentially as follows: When the lever 38 is deviated in clockwise sense from its rest position, indicated in FIG. 7 in dash-dotted lines, to its operating position, indicated in full lines, the gearwheels 107 and 118 mesh with the corresponding gearwheels 106 and 119, respectively. Consequently the film reel 2 drives the tape spool 120 by means of the clutch 114, 115 and the intermediate gear. Since the film reel 2 turns in clockwise sense, the tape spool is driven in counterclockwise sense. The tape 121 is now wound up on the spool 120, whereby a conductive foil 130, provided on the tape 121 lying opposite the two stationary contacts 127, 128 in their initial position and establishing the conductive connection between the contacts 127, 128, is withdrawn from the contacts, whereby the conductive connection is interrupted. Simultaneously the spool 122 is deviated in counterclockwise sense, whereby the spiral spring 125 is strained. When after runoff of the interesting scene, the quick rewind is switched on, the film reel 2 turns in counterclockwise sense. The tape spool 120 is then distorted in clockwise sense by means of the intermediate gear, whereby the tape 121 is uncoiled and wound up on the supply spool 122 driven by the spring 125 until finally the conductive foil 130 comes to lie opposite the stationary contacts 127, 128 and therewith closes the contact. Switching means 131, schematically indicated in the circuit of these contacts, cause an interruption of the projector drive (in FIG. 7 an electromagnetic coupling 132 controllable by said switching means 131 is indicated for example). The torque overload clutch provided between the gearwheels 8 and 113 limits the tension of the tape 121 and prevents damages thereof.

By deviating the lever 38 in counterclockwise sense, it is put in its rest position. In this position the drive connection between the film reel 2 and the tape spool 120 is interrupted. By means of the spring 125 the tape is completely wound up on the spool 122. Even when a large tape length is wound up on the spool 122, the tape is rewound with high velocity by the spring 125. In order to avoid damages at the tape end upon arresting the tape, it is useful to connect one of the tape spools or one of the guide rollers, respectively with a brake, e.g., an airbrake, which limits the rewind velocity.

In an advantageous embodiment of the invention the tape 121 may be provided with visible marks or numerals 133, which may be read through the window of the casing cover 101. Instead of the conductive foil 130 also other methods may be applied in order to release switching impulses. For instance, the tape may show notches and may be scanned by sensing means, which release the switching signal; moreover it is possible to scan the tape photoelectrically or to design the tape as a magnetic tape, as it is known per se, and to record the switching signals by a magnetic soundhead 134 and to receive them again by the same. The last-mentioned method is especially advantageous, when a number of different signals have to be recorded on the tape.

Within the scope of the invention it is also possible to mount the two tape spools exchangeably on the apparatus. The spools 120, 122 for instance may be arranged in a cartridge 135, which is insertable in the casing cover 101. By this measure it is possible to feed a particular program to the apparatus, when a certain film is shown, which may be desirable when the film projector is used in a teaching machine for instance with a linear program.

What is claimed is:

1. In a cinematographic reproducing apparatus for a striplike information carrier member drive means adapted to transport said carrier member alternatively in forward and reversed transporting direction, metering means having an operating condition and a resting condition, in operating condition metering alternatively forwards and backwards according to the transporting direction, said metering means comprising first and second spool means, tape means to be wound up on said spool means and having two ends, one of which being fastened on said first spool means, the other end being fastened on said second spool means, coupling means adapted to connect said drive means with said first spool means and having a connecting position and a disconnecting position, in connecting position said coupling means effecting an unwinding motion of said first spool means, biasing means adapted to impart rotation in unwinding direction to said second spool means, means being controlled by said tape means upon reaching a metering value to be predetermined and comprising stop means adapted to stop said drive means.

2. In a cinematographic apparatus according to claim 1, wherein said drive means comprise takeup reel means for said carrier member, said coupling means being adapted to connect said takeup reel means with said first spool means.

3. In a cinematographic reproducing apparatus according to claim 1, wherein said tape means comprise at least one conductive foil means, said means being controlled by said tape means comprising two contact means, said contact means being positioned to be electrically connected by said conductive foil means.

4. In a cinematographic reproducing apparatus according to claim 3, said means being controlled by said tape means further comprising electric circuit means including said contact means, switch means within said electric circuit means, said switch means being connected with said coupling means, in disconnecting position of said coupling means said switch means being opened.

5. In a cinematographic reproducing apparatus according to claim 1, wherein said tape means have opening means, said means being controlled by said tape means comprising switch means adapted to cooperate with said opening means.

6. In a cinematographic apparatus according to claim 1, wherein said tape means are magnetic tape means, said means being controlled by said tape means comprising magnetic head means.

7. In a cinematographic apparatus according to claim 1, wherein said tape means have visible mark means.

8. In a cinematographic reproducing apparatus according to claim 1, wherein said metering means further comprise torque overload means within the drive for said first spool means, said torque overload means limiting the tension of said tape means.

9. In a cinematographic apparatus according to claim 1, wherein said first and second spool means are removable from said apparatus.

10. In a cinematographic reproducing apparatus according to claim 9, wherein said spool means are arranged within cartridge means.

* * * * *